United States Patent
Han

(10) Patent No.: US 9,651,769 B2
(45) Date of Patent: May 16, 2017

(54) OPTICAL MODULATION UNIT AND STEREOSCOPIC DISPLAY DEVICE COMPRISING SAME

(71) Applicant: Sung Hee Han, Gyeonggi-do (KR)

(72) Inventor: Sung Hee Han, Gyeonggi-do (KR)

( * ) Notice: Subject to any disclaimer, the term of this patent is extended or adjusted under 35 U.S.C. 154(b) by 0 days.

(21) Appl. No.: 14/761,286

(22) PCT Filed: Feb. 7, 2014

(86) PCT No.: PCT/KR2014/001044
§ 371 (c)(1),
(2) Date: Jul. 16, 2015

(87) PCT Pub. No.: WO2014/133269
PCT Pub. Date: Sep. 4, 2014

(65) Prior Publication Data
US 2015/0362721 A1    Dec. 17, 2015

(30) Foreign Application Priority Data
Feb. 26, 2013    (KR) .......................... 10-2013-0020678

(51) Int. Cl.
*G02F 1/1335*    (2006.01)
*G02B 26/00*    (2006.01)
(Continued)

(52) U.S. Cl.
CPC ............ *G02B 26/00* (2013.01); *G02B 27/26* (2013.01); *G02F 1/13363* (2013.01); *G02F 2203/50* (2013.01); *G02F 2413/01* (2013.01)

(58) Field of Classification Search
CPC ..... G02B 26/00; G02B 27/26; G02F 1/13363; G02F 2413/01; G02F 2203/50
See application file for complete search history.

(56) References Cited

U.S. PATENT DOCUMENTS 5,548,422 A * 8/1996 Conner ................ G02B 5/3016
                                                             349/117
5,568,294 A * 10/1996 Lee .................... G02F 1/133711
                                                             349/117
(Continued)

FOREIGN PATENT DOCUMENTS

KR    10-2007-0095101 A    9/2007
KR    10-2011-007798 A    7/2011
(Continued)

OTHER PUBLICATIONS

International Search Report and Written Opionion of the International Searching Authority issued by Korean Patent Office for International Application No. PCT/KR2014/001044.
(Continued)

*Primary Examiner* — Donald Raleigh
(74) *Attorney, Agent, or Firm* — Procopio Cory Hargreaves and Savitch LLP

(57) ABSTRACT

The present inventive concept provides, for an optical modulation unit of which the manufacturing is simplified and the performance is improved and a stereoscopic display having the same, an optical modulation unit and a stereoscopic display device comprising the same, the optical modulation unit comprising: a liquid crystal cell having different phase delay amounts of penetrated light in the on and off states; and a phase delay film part arranged on at least one among an optical path of light having passed through the liquid crystal cell and an optical path of light entering into the liquid crystal cell, and comprising a phase delay film having a fixed phase delay amount, wherein when a wavelength of light, which has passed through both the liquid crystal cell and the phase delay film part, is λ, a phase delay amount of the light having passed through both the liquid crystal cell and the phase delay film part is λ/4 when the liquid crystal cell is in the on state and -λ/4 when the liquid (Continued)

crystal cell is in the off state, or is $-\lambda/4$ when the liquid crystal cell is in the on state and $\lambda/4$ when the liquid crystal cell is in the off state.

12 Claims, 1 Drawing Sheet

(51) Int. Cl.
  *G02B 27/26* (2006.01)
  *G02F 1/13363* (2006.01)

(56) References Cited

U.S. PATENT DOCUMENTS

| | | | | |
|---|---|---|---|---|
| 2009/0002579 | A1* | 1/2009 | Tan | G02F 1/13363 349/9 |
| 2009/0135352 | A1* | 5/2009 | Suzuki | G02F 1/133514 349/106 |
| 2011/0157333 | A1* | 6/2011 | Lee | G02B 27/26 348/56 |
| 2011/0157698 | A1* | 6/2011 | Yoshimi | G02B 27/26 359/462 |
| 2012/0019752 | A1 | 1/2012 | He et al. | |
| 2012/0154698 | A1* | 6/2012 | Matsuhiro | G02B 27/26 349/15 |
| 2012/0327331 | A1* | 12/2012 | Yim | G02F 1/1362 349/62 |
| 2013/0170034 | A1* | 7/2013 | Merrill | G02B 5/3083 359/486.01 |
| 2014/0063211 | A1* | 3/2014 | Fang | G02B 27/26 348/54 |
| 2015/0036215 | A1* | 2/2015 | Uchida | G02B 5/0242 359/489.09 |

FOREIGN PATENT DOCUMENTS

| | | |
|---|---|---|
| KR | 10-2011-0135598 A | 12/2011 |
| KR | 10-2012-0046707 A | 5/2012 |

OTHER PUBLICATIONS

Extended European Search Report received in related European patent application No. 14757304.2, dated Jul. 27, 2016, 11 pages.

* cited by examiner

OPTICAL MODULATION UNIT AND STEREOSCOPIC DISPLAY DEVICE COMPRISING SAME

TECHNICAL FIELD

The present inventive concept relates to an optical modulation unit and a stereoscopic display device comprising the same, and more particularly, to an optical modulation unit having a simplified manufacturing process and improved performance, and a stereoscopic display device comprising the same.

BACKGROUND ART

In general, stereoscopic display devices may be classified into a glasses type and a non-glasses type. Most large stereoscopic display devices employ a glasses type. In a stereoscopic display device, light for a left-eye image and light for a right-eye image are emitted in different polarization states and, in glasses worn by a viewer, the light for a left-eye image is incident only on the left eye and the light for a right-eye image is incident only on the right eye, thereby enabling the viewer to feel a stereoscopic sense.

However, in the stereoscopic display device, it is difficult to accurately emit the light for a left-eye image and the light for a right-eye image in preset different polarization states, or it is difficult to manufacture a stereoscopic display device that is capable of accurately emitting the light for a left-eye image and the light for a right-eye image in preset different polarization states.

DETAILED DESCRIPTION OF THE INVENTIVE CONCEPT

Technical Problem

The present inventive concept provides an optical modulation unit having a simplified manufacturing process and improved performance, and a stereoscopic display device comprising the same. However, the scope of the present inventive concept is not limited thereto.

Technical Solution

According to an aspect of the present inventive concept, there is provided an optical modulation unit including a liquid crystal cell having different phase retardation amounts of penetrated light when a first signal and a second signal are applied to the liquid crystal cell, and a phase retardation film part arranged on at least one of an optical path of light having passed through the liquid crystal cell and an optical path of light entering into the liquid crystal cell, the phase retardation film part comprising a phase retardation film having a fixed phase retardation amount, wherein, when a wavelength of light having passed through both the liquid crystal cell and the phase retardation film part is $\lambda$, a phase retardation amount of the light having passed through both the liquid crystal cell and the phase retardation film part is $\lambda/4$ when the first signal is applied to the liquid crystal cell and $-\lambda/4$ when the second signal is applied to the liquid crystal cell.

According to an aspect of the present inventive concept, there is provided an optical modulation unit including a liquid crystal cell comprising a plurality of first sub-electrodes and a plurality of second sub-electrodes having a stripe shape and alternately arranged on a same plane, a second electrode arranged facing the plurality of first sub-electrodes and the plurality of second sub-electrodes, and a liquid crystal layer interposed between the plurality of first and second sub-electrodes and the second electrode, wherein a phase retardation amount of light passing through an area corresponding to the plurality of first sub-electrodes is different from a phase retardation amount of light passing through an area corresponding to the plurality of second sub-electrodes when a first signal is applied to the plurality of first sub-electrodes and a second signal is applied to the plurality of second sub-electrodes, and a phase retardation film part arranged on at least one of an optical path of light having passed through the liquid crystal cell and an optical path of light entering into the liquid crystal cell, the phase retardation film part comprising a phase retardation film having a fixed phase retardation amount, wherein, when a wavelength of light having passed through both the liquid crystal cell and the phase retardation film part $\lambda$, a phase retardation amount of the light having passed through both the liquid crystal cell and the phase retardation film part in a state in which the first signal is applied to the plurality of first sub-electrodes and the second signal is applied to the plurality of second sub-electrodes is $\lambda/4$ for light passing through the area corresponding to the plurality of first sub-electrodes and $-\lambda/4$ for light passing through the area corresponding to the plurality of second sub-electrodes.

A phase retardation amount of the phase retardation film part may be an amount except for $\lambda/4$ and $-\lambda/4$.

The phase retardation film may include a liquid crystal polymer film.

The liquid crystal cell may include a liquid crystal cell using any one of an optically compensated bend (OCB) mode, an electrically controlled birefringence (ECB) mode, and a twist nematic (TN) mode.

The $\lambda$ may be 550 nm.

The first signal and the second signal may not be off signals.

According to an aspect of the present inventive concept, there is provided a stereoscopic display device including a display unit displaying an image, and the optical modulation unit arranged in front or the rear of the display unit.

Advantageous Effects

An optical modulation unit having a simplified manufacturing process and improved performance, and a stereoscopic display device comprising the same, may be implemented. However, the scope of the present inventive concept is not limited to the effect.

BEST MODE

Figure 1:
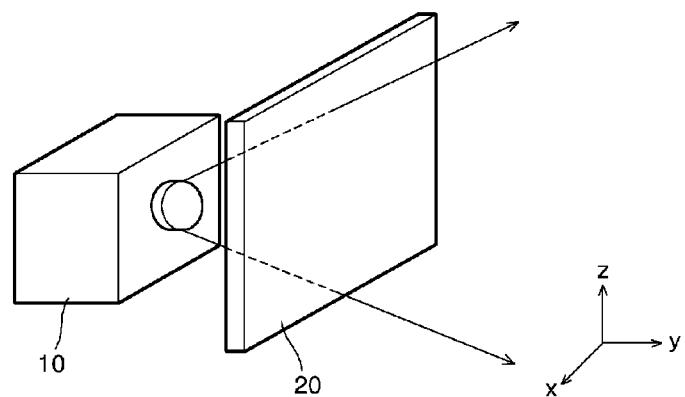
FIG. 1 is a perspective view of a stereoscopic display device according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. In the drawings, the thicknesses of layers and regions are exaggerated for convenience of explanation.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Figure 2:
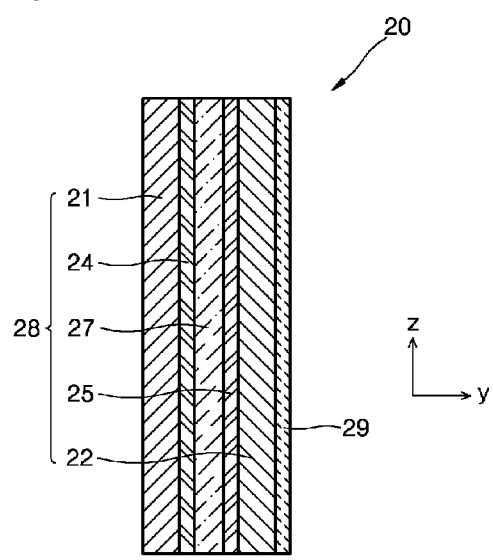
FIG. 2 is a cross-sectional view of an optical modulation unit of FIG. 1.

FIG. 1 is a perspective view of a stereoscopic display device according to an exemplary embodiment. FIG. 2 is a cross-sectional view of an optical modulation unit of FIG. 1.

A stereoscopic display device according to the present exemplary embodiment may include a display unit 10 displaying an image and an optical modulation unit 20 arranged in front or the rear of the display unit 10, that is, on an optical path of light emitted from the display unit 10 or an optical path of light entering into the display unit 10. In FIG. 1, the optical modulation unit 20 is arranged in a +y direction of the display unit 10.

The display unit 10 may be an optical device such as a projector, or a flat panel display unit such as a liquid crystal display unit or an organic light-emitting display unit. In either case, the display unit 10 may display an image of linearly polarized light. To this end, the display unit 10 may include a linearly polarized panel or a linearly polarized film, if necessary. Alternatively, the display unit 10 may be diversely modified such that it does not display an image of linearly polarized light and the optical modulation unit 20 that is arranged in front of the display unit 10 includes the linearly polarized panel or linearly polarized film.

The optical modulation unit 20 includes a liquid crystal cell 28 and a phase retardation film part 29. If the display unit 10 does not display the image of linearly polarized light, the optical modulation unit 20 may include the linearly polarized panel or linearly polarized film, if necessary. In this case, the linearly polarized panel or linearly polarized film may be arranged at a position where the light emitted from the display unit 10 passes before entering into the liquid crystal cell 28 or the phase retardation film part 29.

The liquid crystal cell 28 delays a phase of light that enters and exits with respect to the liquid crystal cell 28. The liquid crystal cell 28, as illustrated in FIG. 2, may include a first substrate 21 and a second substrate 22 arranged facing each other, a first electrode 24 formed on a surface of the first substrate 21 in a direction toward the second substrate 22, a second electrode 25 formed on a surface of the second substrate 22 in a direction toward the first substrate 21, and a liquid crystal layer 27 filled between the first electrode 24 and the second electrode 25.

The liquid crystal cell 28 may be a liquid crystal cell using any one of an optically compensated bend (OCB) mode, an electrically controlled birefringence (ECB) mode, and a twist nematic (TN) mode, and particularly, a liquid crystal cell using the OCB mode. The liquid crystal cell 28, as described below, may delay a phase of in incident light by a preset amount, with the phase retardation film part 29, to have a viewer feel a stereoscopic sense. In this connection, if a response speed of the liquid crystal cell 28 is not fast sufficiently for the display unit 10 to alternately display a left-eye image and a right-eye image, phases of light for a left-eye image and light for a right-eye image are not timely delayed by a preset amount, which may have the left-eye image viewed by the right eye or the right-eye image by the left eye, thus preventing a viewer from feeling an optimal stereoscopic sense. Accordingly, the liquid crystal cell 28 may be a liquid crystal cell using the OCB mode that secures a fast response speed.

In the liquid crystal cell 28, when the first signal or the second signal is applied thereto, that is, a preset electric first signal or a preset electric second signal is applied between the first electrode 24 and the second electrode 25, a phase retardation amount of passed light differs, which is described below in detail.

While the phase retardation film part 29 includes at least one of a phase retardation film, the phase retardation film part 29 is illustrated in the drawings to include only one phase retardation film. The phase retardation film may be arranged on at least one of an optical path of light that has passed through the liquid crystal cell 28 and an optical path of light that enters into the liquid crystal cell 28. Alternatively, the phase retardation film may be arranged on both of the optical path of light that has passed through the liquid crystal cell 28 and the optical path of light that enters into the liquid crystal cell 28. When the phase retardation film is arranged only on one of the above optical paths, no one phase retardation film, but a plurality of phase retardation films may be arrayed in a layer shape.

The phase retardation film may be a liquid crystal polymer film. In particular, when the phase retardation film is formed on the liquid crystal cell 28, the phase retardation film may be implemented by a liquid crystal polymer film to remove dispersion difference between the liquid crystal cell 28 and the phase retardation film.

The phase retardation film part 29 may include at least one of an O plate film, an A plate film, a negative A plate film, a negative O plate film, and a biaxial film. The phase retardation film part 29 delays a phase of light passing through the phase retardation film part 29 by a constant fixed amount.

The fixed phase retardation amount signifies a phase retardation amount of the light passing through the phase retardation film when the phase retardation film part 29 includes one phase retardation film, and a phase retardation amount of all lights passing through a plurality of phase retardation films included in the phase retardation film part 29. When the phase retardation film part 29 includes phase retardation films arranged on both of the optical path of light that has passed through the liquid crystal cell 28 and the optical path of light entering into the liquid crystal cell 28, the fixed phase retardation amount signifies a phase retardation amount of the light passing through both of the phase retardation films, except for the phase retardation amount by the liquid crystal cell 28.

In the optical modulation unit 20, when a wavelength of the light having passed through both of the liquid crystal cell 28 and the phase retardation film part 29 is $\lambda$, a phase retardation amount of the light having passed through both of the liquid crystal cell 28 and the phase retardation film part 29 is $\lambda/4$ when the first signal is applied to the liquid crystal cell 28 and $-\lambda/4$ when the second signal is applied to the liquid crystal cell 28.

As such, when the display unit 10 displays any one of the left-eye image and the right-eye image, the phase of light of the image is delayed by $\lambda/4$. When the display unit 10 displays the other one of the left-eye image and the right-eye image, the phase of light of the image is delayed by $-\lambda/4$. Accordingly, the light for a left-eye image and the light for a right-eye image may have different phases from each other. Thus, as the viewer uses glasses that pass only light of a specific phase, only the light for a left-eye image is incident upon the left eye and only the light for a right-eye image is incident upon the right eye, so that the viewer may feel a stereoscopic sense.

In other words, a left eye part of the glasses worn by the viewer delays a phase of passing light by any one of λ/4 and −λ/4 and allows only light polarized in one direction to pass through a linear polarizing plate, and a right eye part of the glasses delays a phase of passing light by the other of λ/4 and −λ/4 and allows only light polarized in other direction perpendicular to the one direction to pass through a linear polarizing plate. Accordingly, only the light for a left-eye image is incident upon the left eye and only the light for a right-eye image is incident upon the right eye, so that the viewer may feel a stereoscopic sense.

In order to have a phase of light of any one of the left-eye image and the right-eye image displayed by the display unit 10 delayed by λ/4 and a phase of light of the other one of the left-eye image and the right-eye image delayed by −λ/4, two liquid crystal cells have been used. In other words, one of the liquid crystal cells delays a phase of passed light in an on state by λ/4 and the other one of the liquid crystal cells delays a phase of passed light in the on state by −λ/4, thereby forming an optical modulation unit by using the two liquid crystal cells, alternately being in the on state. Accordingly, since two liquid crystal cells are used, structure may become complicated and manufacturing costs may increase.

However, in the optical modulation unit according to the present exemplary embodiment or the stereoscopic display device comprising the same, as described above, the optical modulation unit 20 includes one liquid crystal cell 28 and the phase retardation film part 29 that is not an additional liquid crystal cell. Accordingly, compared to the above-described optical modulation unit, the structure may become simplified and the manufacturing costs may be greatly reduced.

Alternatively, it is difficult to manufacture the phase retardation film part 29 to accurately delay the phase of passed light by λ/4 or −λ/4. Accordingly, even when the phase retardation film part 29 is manufactured to intend to delay the phase of passed light by any one of λ/4 and −λ/4 and the liquid crystal cell 28 is manufactured to prevent the phase of passed light from being changed or to delay the phase of passed light by λ/2 according to an on or off state, if the phase retardation film part 29 is not manufactured to accurately delay the phase of passed light by λ/4 or −λ/4, the viewer may feel a quite poor stereoscopic sense.

However, in the optical modulation unit according to the present exemplary embodiment or the stereoscopic display device comprising the same, the phase retardation film part 29 delays the phase of passed light by a fixed amount. In this case, the phase retardation film part 29 may not necessarily delay the phase of passed light by λ/4 or −λ/4. In other words, a phase retardation amount of the phase retardation film part 29 may be an amount except for λ/4 and −λ/4.

In this case, in consideration of the amount that delays the phase of passed light in the phase retardation film part 29, the liquid crystal cell 28 that may precisely control the phase retardation amount of passed light is used and thus the phase of light having passed through both of the liquid crystal cell 28 and the phase retardation film part 29 may be delayed by λ/4 or −λ/4 when the first signal and the second signal are applied to the liquid crystal cell 28. From this point of view, the first signal and the second signal may not be off signals.

For example, with respect to light having a wavelength of about 550 nm, the phase retardation film part 29 may delay a phase of passed light not by −137.5 nm, that is, −λ/4, but by −142 nm. In this case, when a first signal to delay the phase of passed light by 4.5 nm and a second signal to delay the phase of passed light by 279.5 nm are alternately applied to the liquid crystal cell 28, the light having a wavelength of about 550 nm passing through the optical modulation unit 20 including the liquid crystal cell 28 and the phase retardation film part 29 alternately has accurate phase delays of −137.5 nm, that is, −λ/4, and +137.5 nm, that is, +λ/4. Accordingly, an environment in which the viewer may vividly feel a stereoscopic sense may be secured.

MODE OF THE INVENTIVE CONCEPT

In the above description, while the display unit 10 alternately displays the left-eye image and the right-eye image, the optical modulation unit 20 delays the phase of light by any one of λ/4 and −λ/4 when the display unit 10 displays the left-eye image and the phase of light by the other one of λ/4 and −λ/4 when the display unit 10 displays the right-eye image. However, the present inventive concept is not limited thereto.

Figure 3:
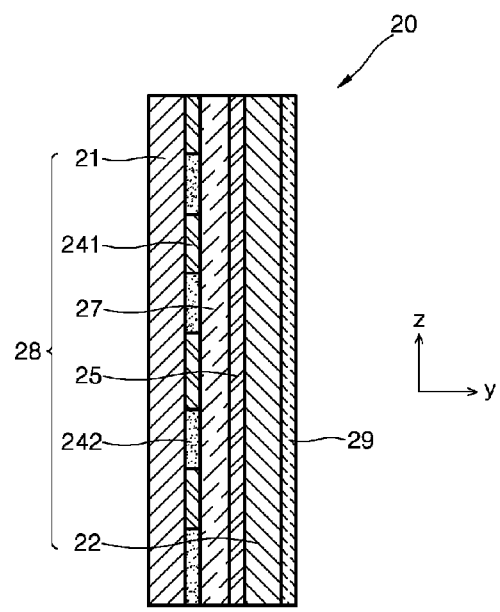
FIG. 3 is a cross-sectional view of an optical modulation unit according to another exemplary embodiment.

For example, unlike the above-described exemplary embodiment, in the optical modulation unit 20, as illustrated in FIG. 3, a first electrode may include a plurality of first sub-electrodes 241 and a plurality of second sub-electrodes 242 which have a stripe shape extending in a direction +x and are alternately arranged in a direction z on an identical plane (z-x plane). In this case, the second electrode 25 is arranged facing the first sub-electrodes 241 and the second sub-electrodes 242, and a liquid crystal layer 27 is interposed between the first and second sub-electrodes 241 and 242 and the second electrode 25.

In the optical modulation unit 20, when a first signal is applied to the first sub-electrodes 241 and a second signal is applied to the second sub-electrodes 242, a phase retardation amount of light passing through an area corresponding to the first sub-electrodes 241 and a phase retardation amount of light passing through an area corresponding to the second sub-electrodes 242 are different from each other.

In this state, when a wavelength of light having passed through both of the liquid crystal cell 20 and the phase retardation film part 29 is λ, the phase retardation amount light having passed through both of the liquid crystal cell 20 and the phase retardation film part 29 may be λ/4 for the light passing through the area corresponding to the first sub-electrodes 241 and −λ/4 for the light passing through the area corresponding to the second sub-electrodes 242.

For example, with respect to light having a wavelength of about 550 nm, the phase retardation film part 29 may delay a phase of passed light not by −137.5 nm, that is, −λ/4, but by −142 nm. In this case, when a first signal to delay the phase of light passing through the area corresponding to the first sub-electrodes 241 by 4.5 nm is applied to the first sub-electrodes 241 of the liquid crystal cell 28 and a second signal to delay the phase of light passing through the area corresponding to the second sub-electrodes 242 by 279.5 nm is applied to the second sub-electrodes 242 of the liquid crystal cell 28, the light having a wavelength of about 550 nm passing through the optical modulation unit 20 including the liquid crystal cell 28 and the phase retardation film part 29 has accurate phase delays of −137.5 nm, that is, −λ/4, in the area corresponding to the first sub-electrodes 241, and +137.5 nm, that is, +λ/4, in the area corresponding to the second sub-electrodes 242. Accordingly, an environment in which the viewer may vividly feel a stereoscopic sense may be secured by displaying any one of the left-eye image and the right-eye image in the area corresponding to the first sub-electrodes 241 of the display unit 10 and the other one of the left-eye image and the right-eye image in the area corresponding to the second sub-electrodes 242 of the display unit 10.

The above-description with reference to FIG. 2 may be applied to the present exemplary embodiment, except for the descriptions of the first sub-electrodes 241 and the second sub-electrodes 242.

While the present inventive concept has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the present inventive concept as defined by the following claims.

INDUSTRIAL APPLICABILITY

According to the present inventive concept, the present invention may be used for fields of an optical modulation unit having a simplified manufacturing process and improved performance, and a stereoscopic display device comprising the same.

The invention claimed is:

1. An optical modulation unit comprising:
a liquid crystal cell having different phase retardation amounts of penetrated light when a first signal and a second signal are applied to the liquid crystal cell; and
a phase retardation film part arranged on at least one of an optical path of light having passed through the liquid crystal cell and an optical path of light entering into the liquid crystal cell, the phase retardation film part comprising a phase retardation film having a fixed phase retardation amount except for $\lambda/4$ and $-\lambda/4$, when a wavelength of passed light is $\lambda$,
wherein a phase retardation amount of the light having passed through both the liquid crystal cell and the phase retardation film part is $\lambda/4$ when the first signal is applied to the liquid crystal cell and $-\lambda/4$ when the second signal is applied to the liquid crystal cell.

2. An optical modulation unit comprising:
a liquid crystal cell comprising a plurality of first sub-electrodes and a plurality of second sub-electrodes having a stripe shape and alternately arranged on a same plane, a second electrode arranged facing the plurality of first sub-electrodes and the plurality of second sub-electrodes, and a liquid crystal layer interposed between the plurality of first and second sub-electrodes and the second electrode, wherein a phase retardation amount of light passing through an area corresponding to the plurality of first sub-electrodes is different from a phase retardation amount of light passing through an area corresponding to the plurality of second sub-electrodes when a first signal is applied to the plurality of first sub-electrodes and a second signal is applied to the plurality of second sub-electrodes; and
a phase retardation film part arranged on at least one of an optical path of light having passed through the liquid crystal cell and an optical path of light entering into the liquid crystal cell, the phase retardation film part comprising a phase retardation film having a fixed phase retardation amount except for $\lambda/4$ and $-\lambda/4$, when a wavelength of passed light is $\lambda$,
wherein a phase retardation amount of the light having passed through both the liquid crystal cell and the phase retardation film part in a state in which the first signal is applied to the plurality of first sub-electrodes and the second signal is applied to the plurality of second sub-electrodes is $\lambda/4$ for light passing through the area corresponding to the plurality of first sub-electrodes and $-\lambda/4$ for light passing through the area corresponding to the plurality of second sub-electrodes.

3. The optical modulation unit of claim 1, wherein the phase retardation film comprises a liquid crystal polymer film.

4. The optical modulation unit of claim 1, wherein the liquid crystal cell is a liquid crystal cell using any one of an optically compensated bend (OCB) mode, an electrically controlled birefringence (ECB) mode, and a twist nematic (TN) mode.

5. The optical modulation unit of claim 1, wherein the $\lambda$, is about 550 nm.

6. The optical modulation unit of claim 1, wherein the first signal and the second signal are not off signals.

7. A stereoscopic display device comprising:
a display unit displaying an image; and
an optical modulation unit of claim 1, arranged in front or the rear of the display unit.

8. The optical modulation unit of claim 2, wherein the phase retardation film comprises a liquid crystal polymer film.

9. The optical modulation unit of claim 2, wherein the liquid crystal cell is a liquid crystal cell using any one of an optically compensated bend (OCB) mode, an electrically controlled birefringence (ECB) mode, and a twist nematic (TN) mode.

10. The optical modulation unit of claim 2, wherein the $\lambda$, is about 550 nm.

11. The optical modulation unit of claim 2, wherein the first signal and the second signal are not off signals.

12. A stereoscopic display device comprising:
a display unit displaying an image; and
an optical modulation unit of claim 2, arranged in front or the rear of the display unit.

* * * * *